(12) United States Patent
Liu et al.

(10) Patent No.: US 10,607,098 B2
(45) Date of Patent: Mar. 31, 2020

(54) SYSTEM OF A VIDEO FRAME DETECTOR FOR VIDEO CONTENT IDENTIFICATION AND METHOD THEREOF

(71) Applicant: Aupera Technologies, Inc., Vancouver (CA)

(72) Inventors: Xiaoxiang Liu, Vancouver (CA); Fu Lai Zhao, Vancouver (CA); Zhengning Zhou, Vancouver (CA); Yu Feng Liao, Vancouver (CA)

(73) Assignee: Aupera Technologies, Inc. (CA)

( * ) Notice: Subject to any disclaimer, the term of this patent is extended or adjusted under 35 U.S.C. 154(b) by 149 days.

(21) Appl. No.: 15/968,071

(22) Filed: May 1, 2018

(65) Prior Publication Data

US 2019/0147279 A1 May 16, 2019

Related U.S. Application Data

(60) Provisional application No. 62/585,197, filed on Nov. 13, 2017.

(51) Int. Cl.
| | |
|---|---|
| *G06K 9/00* | (2006.01) |
| *G06K 9/62* | (2006.01) |
| *G06K 9/46* | (2006.01) |
| *G06K 9/68* | (2006.01) |
| *G06K 9/38* | (2006.01) |

(52) U.S. Cl.
CPC ..... *G06K 9/00993* (2013.01); *G06K 9/00744* (2013.01); *G06K 9/00986* (2013.01); *G06K 9/38* (2013.01); *G06K 9/46* (2013.01); *G06K 9/6202* (2013.01); *G06K 9/6215* (2013.01); *G06K 9/6267* (2013.01); *G06K 9/6857* (2013.01); *G06K 9/00771* (2013.01)

(58) Field of Classification Search
CPC .......... G06K 9/00993; G06K 9/00744; G06K 9/00986; G06K 9/38; G06K 9/46; G06K 9/6202; G06K 9/6215; G06K 9/6267; G06K 9/6857; G06K 9/00771; G06K 9/62; G06K 9/40
See application file for complete search history.

(56) References Cited

U.S. PATENT DOCUMENTS

2010/0290710 A1* 11/2010 Gagvani ............ G06K 9/00543
382/224

* cited by examiner

*Primary Examiner* — Leon Viet Q Nguyen
(74) *Attorney, Agent, or Firm* — Timothy T. Wang; Ni, Wang & Massand, PLLC (57) ABSTRACT

A key frame detector and method having input interface accepting multiple frames including a previous frame and a current frame, a programmable logic chip coupled to the input interface that receives a background frame, determines a similarity based on a comparison of the current frame with the background frame and discards the current frame if the similarity is greater than a predetermined similarity threshold, determines an absolute difference on a pixel by pixel basis between the current frame and the previous frame and discards the current frame if the absolute difference is less than a predetermined absolute difference threshold, determines a wholeness of an object in the current frame and discards the current frame if the object is not whole, determines whether the current frame with the whole object has been previously provisionally selected and discards if it has and analyzes the Whole object via an object detector.

20 Claims, 6 Drawing Sheets

Event: Multiple objects entering and leaving

Figure 1 Event: Single object entering and leaving

Figure 2 Event: Single object entering

Figure 3 Event: Multiple objects entering and leaving

Figure 4 Region based event detection engine for objects A and B

Figure 5 System overview

Figure 6 Background frame generation

Figure 7 Entering and leaving event learning

Figure 8 Cascade decision making layer # 1: frame difference detector

Figure 9 Cascade decision making layer # 2: regional multi-object inference engine Figure 10 Background frame updating mechanism

SYSTEM OF A VIDEO FRAME DETECTOR FOR VIDEO CONTENT IDENTIFICATION AND METHOD THEREOF

BACKGROUND

The instant disclosure related to a system of video frame detector for video content identification of multi-object entering and leaving the frame detector.

When surveillance videos are used, video content identification is the most important task.

With overwhelmingly superior accuracy due to the advancement of convolutional neural networks, visual search, object detection, object localization and content tagging/indexing over video becomes an extremely computationally-heavy task which relies largely on dedicated Graphic Processing Units (GPUs). GPU servers are an expensive investment and should be used as efficiently as possible.

Due to advancements in camera technology, surveillance videos are often recorded at 30 or even 60 frames per second (fps) at a resolution of 1080 p and above, resulting in many frame redundancies in the videos being processed by the GPU. Furthermore, due to form-factor and power consumption constraints, running video content identification on embedded devices' CPU (with or without GPU), if not impossible, often becomes an extremely inefficient task in terms of speed and latency, by skipping redundant frames in which no object-of-interest is leaving or entering the video (i.e., no new object-of-interest is present in the scene), the CPU and/or GPUs' workload can be drastically reduced while maintaining high identification accuracy afterwards.

Existing approaches either measure the object change by calculating the frame difference, or simply apply a fixed frame-skipping interval to skip the same object that appears at multiple frames, and frame difference detection is based on scene and object's motion, which is a camera-independent, global measurement; and is not capable of capturing the motion pattern for each individual object, and it is desirable to skip those frames in which an object enters the scene but stays stationary for a very long period, or an object moves along the entire scene after the system already cause its appearance, motion detection would fail in the latter case as it cannot reasoning what causes the motion, not to mention if the motion being triggered by multiple objects simultaneously, multi-object tracking may be a viable solution; however, due to its complexity of maintaining a buffer for associating hypotheses, its computation overhead is enormous and sometimes can be an overkill to the frame skipping task, and frame-by-frame skipping can be too brutal to maintain reasonably accuracy of object detection and far from stable as it does not rely on any scene specific information.

Therefore, systems and methods of a video frame detector for video content identification of multi-object entering and leaving the frame detector has been disclosed.

SUMMARY

One embodiment a key frame selector having an input interface accepting a video stream with a plurality of frames, wherein the plurality of frames has at least a previous frame and a current frame, a programmable logic chip coupled to the input interface, wherein the programmable logic chip, receives a background frame, determines a similarity based on a comparison of the current frame with the background frame, discards the current frame if the similarity is greater than a predetermined similarity threshold, determines an absolute difference on a pixel by pixel basis between the current frame and the previous frame, discards the current frame if the absolute difference is less than a predetermined absolute difference threshold, determines a wholeness of an at least one object in the current frame, discards the current frame if the at least one object is not whole, provisionally selects the current frame if the at least one object is whole, determines whether the current frame with the whole at least one object has been previously provisionally selected, discards the current frame if the whole at least one object has been previously provisionally selected and analyzes the whole at least one object via an object detector in the provisionally selected current frame.

In another embodiment of a method of determining a key frame, having receiving from an input interface a plurality of frames having at least a previous frame and a current frame, assigning an at least one color value for an at least one pixel in the plurality of frames, storing the at least one color value in an array, generating a background frame based on a most prevalent color value for the at least one color value in the array, storing the background frame, determining a similarity based on a comparison of the current frame with the background frame, discarding the current frame if the similarity is greater than a predetermined similarity threshold, determining an absolute pixel by pixel difference between the current frame and the previous frame, discarding the current frame if the absolute pixel by pixel difference is less than a predetermined absolute difference threshold, regionally filtering an at least one object at least one of entering the current frame and leaving the current frame and selecting the current frame if the at least one object at least one of enters the current frame and leaves the current frame.

In yet another embodiment of a method of determining a key frame, having receiving a plurality of frames from an input interface, wherein the plurality of frames has at least a previous frame and a current frame, receiving a background frame, determining a similarity based on a comparison of the current frame with the background frame, discarding the current frame if the similarity is greater than a predetermined similarity threshold, determining an absolute difference on a pixel by pixel basis between the current frame and the previous frame, discarding the current frame if the absolute difference is less than a predetermined absolute difference threshold, determining a wholeness of an at least one object in the current frame, discarding the current frame if the at least one object is not whole, provisionally selecting the current frame if the at least one object is whole, determining whether the current frame with the whole at least one object has been previously provisionally selected, discarding the current frame if the whole at least one object has been previously provisionally selected and analyzing the whole at least one object via an object detector in the provisionally selected current frame.

The disclosed systems and methods of a video frame detector improves the current methods of frame detection. It significantly improves the operation of current video processing systems by dramatically reducing computational workloads and increasing the processing speed and efficiency.

DETAILED DESCRIPTION

One advantage of the disclosure systems and methods is reducing the computational workload of a computer processor by offloading frame selection and object identification to a graphical processor unit that has been streamlined for unique object identification. In at least one embodiment the computational workload of both the CPU and GPU are dramatically reduced by removing empty frames and frames containing partial and redundant whole objects. This allows accelerated video processing of fixed-angle surveillance cameras and several optimizations which are made to detect redundant frames. For example, a background frame may be used to identify and eliminate empty frames, and frames in which the objects are not moving are easily removed by frame subtraction. Because the inference engine is designed for the use of object detection in video, the invention is focused on detecting the frames in which video contents (i.e., foreground objects) are changing (i.e., when objects are entering or leaving the camera's viewpoint). Experiment shows a very promising result when applying this technology in surveillance videos. For heavy traffic and multiple vehicle (i.e., truck, bus, car, bicycle) detection scenario, this approach achieves 12 times frame skipping rate at an object detection accuracy of 93.25%. The computation overhead (vs. fixed frame skipping interval) is only 3% of the baseline object detector. These and other benefits of one or more aspects make the disclosed systems and methods suitable for areas such as key-frame detection for detecting scene changes.

Three key video scenarios describe the functionality of the proposed invention.

Figure 1:
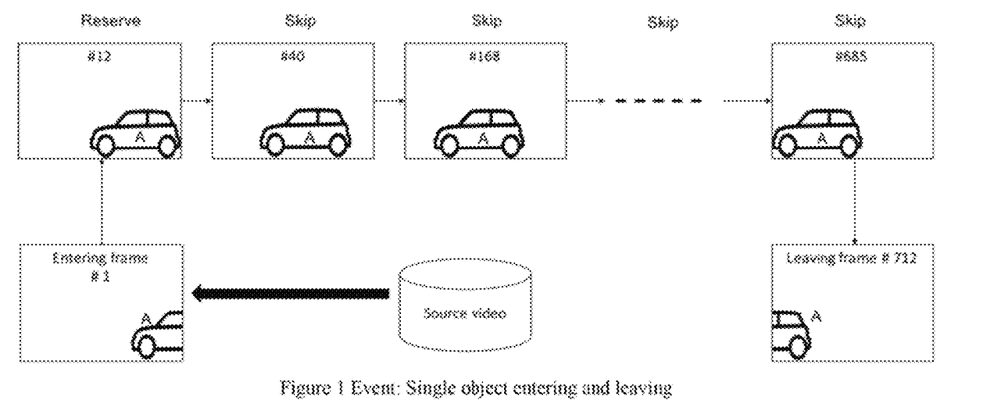
FIG. 1 is a depiction of an object enters the video, moves across a camera's view and leaves the video.

(1) The first scenario is when an object enters the video, moves across camera's view and leaves the video and the scenario is displayed in FIG. 1.

(2) The solution sends only one frame to the object detector, the frame is when enough of the object appears in the frame to result in an accurate detection, this is number 12 in the figure, and the object is identified as a car and the contents of the subsequent frames are set as car and skipped, until the object is detected as leaving the camera's view in frame 712. This sending of only one frame of a set of multiple frames, reducing the workload and time required to identify the object. Due to the fact that the object is identified only once and not over and over again.

(3) This is detected by a region-based inference engine and the contents are reset to empty after frame 712 until a new object enters the camera's view.

(1) The second scenario is when an object enters the video and stays motionless for some period of time. This scenario is displayed in FIG. 2.

Figure 2:
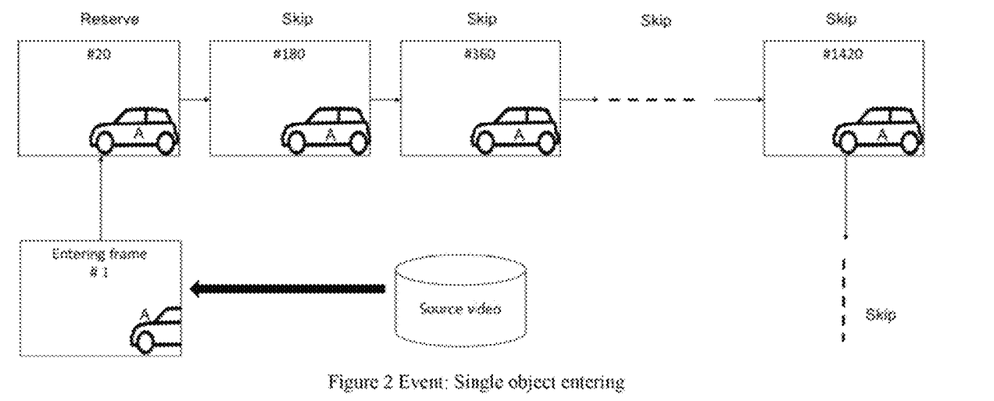
FIG. 2 is a depiction of an object enters the video and stays motionless for some period of time.

(2) The first frame sent to the object detector is when the car has entered the camera's view and is identifiable.

(3) The contents of the video are set to car and subsequent frames are skipped due to lack of motion detected between frames. There is no reset-to-empty as no leaving is detected.

Figure 3:
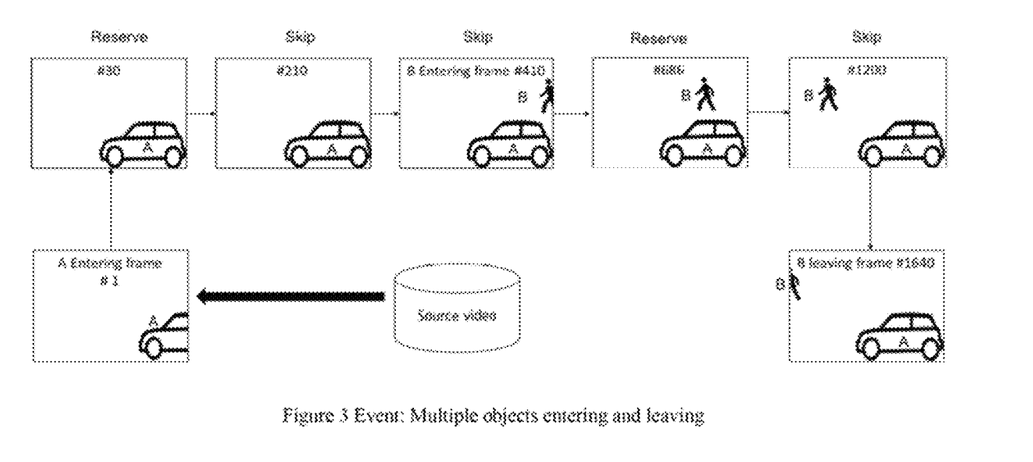
FIG. 3 is a depiction of multiple objects are entering or leaving the camera's view.

(1) The third and most complicated scenario is when multiple objects are entering or leaving the camera's view and this scenario is displayed in FIG. 3.

(2) In frame 30, the car is moving into the video, and therefore this frame must be sent to the object detector, as there is a change in content.

(3) The following frames are skipped until frame 686 in which a person has just entered and is identifiable, and the object detector now identifies the contents as one car and one pedestrian.

(4) As long as the two objects are moving inside the camera's view without entering and leaving, the frames are skipped and the contents are unchanged.

(5) When the pedestrian leaves the video in frame 1640, the frame is sent to the detector which identifies that there is only one car in the frame now. Thus even in the condition of having multiple objects, only one whole object of each type need be identified, with the entire redundant frames removed from consideration.

Figure 4:
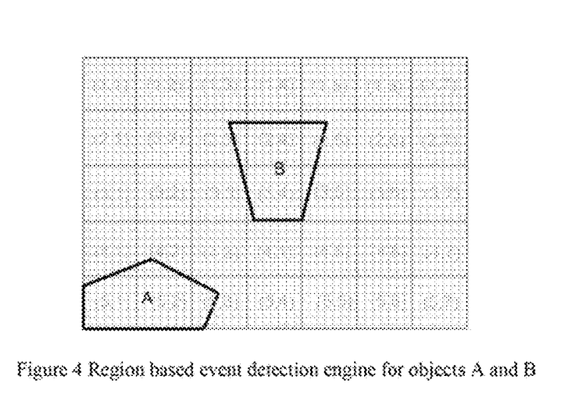
FIG. 4 is a depiction of region based event detection engine for objects A and B.

The inference engine processes one frame after another by dividing each frame into a number of connected regions or grids which displayed in FIG. 4.

The inference engine which makes the binary decision (i.e., skip the frame or not) is initialed by processing raw pixel information from each region and then accumulated in a regionally weighted manner at the end over all regions.

The present invention dots not limit the number of object being concurrently observed at a time.

For simplicity of illustration and description. FIG. 4 displays two objects (i.e., (A) one car and (B) one pedestrian) within one frame at a time.

Figure 5:
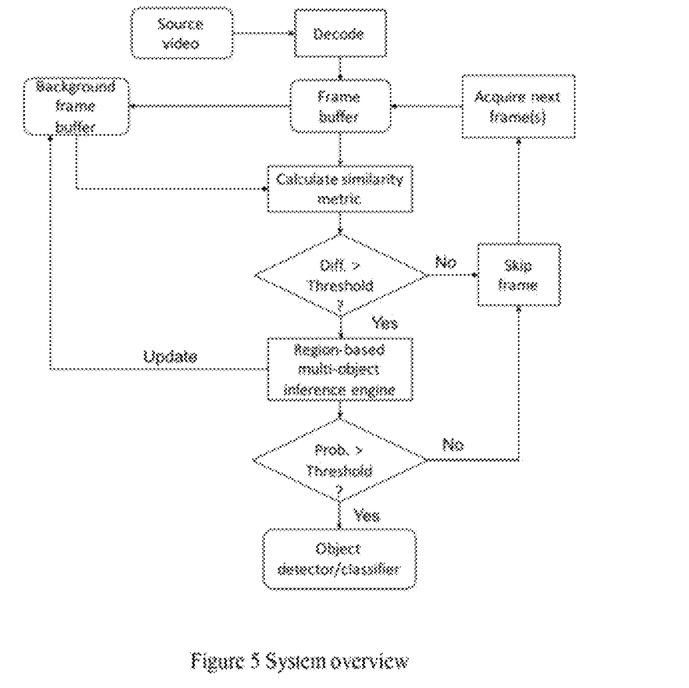
FIG. 5 is a depiction of system overview.

The inference engine's purpose is to identify the redundant frames from a video stream which displayed in FIG. 5.

The inference engine has an initialization phase, which samples a portion of the video to obtain key metrics such as the background frame, mean square error (MSE) ranges, and training data for the subsequent learning.

The inference engine can be used on the video after the learning phase is complete.

Frames do not have objects of interest in the video will be skipped first, and this is done by evaluating the frame difference of the incoming frames to the background frame.

Frames have an object of interest in the video, but the object is not moving can also be skipped by a frame subtraction of the current frame and the previous frame.

Frames show an object moving across the camera's view are skipped, because the contents of the video are not changing during this period, and these frames may be detected by a machine-learning algorithm specially trained to capture these frames.

Frames passes through these skip conditions will be sent to the object detector. This frame skipping of empty frames and frames containing partial objects or redundant whole objects, dramatically reduces the workload on the computer system and increases the processing speed and accuracy by honing in only on whole objects entering or leaving the frame.

The object detector is responsible for locating and classifying the objects within the frame and is not a part of the engine.

Before running the inference engine, the pre-processing steps are required for each video.

Figure 6:
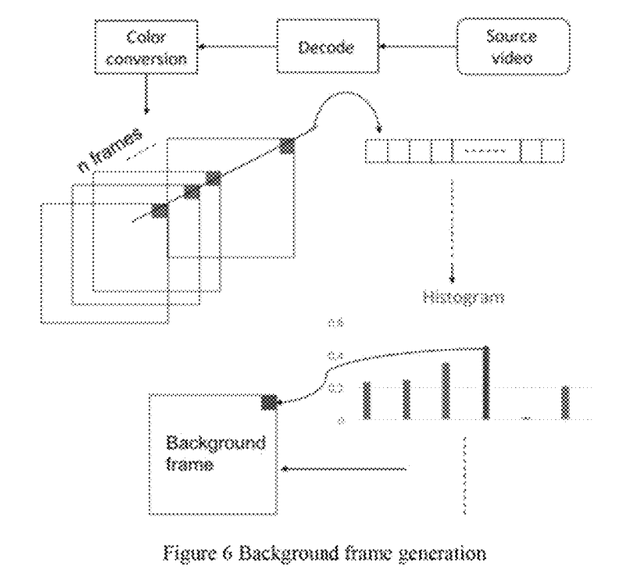
FIG. 6 is a depiction of background frame generation.

Referring to FIG. 6, the background frame must be generated, and it is done by examining the first N images in the video sequence which are first decoded and converted into the appropriate color format.

The color format may be converted from YUV to RGB.

An array is created for each pixel location of the image of length N, a plurality of arrays holds a plurality of pixel values of these pixel locations for all N images, and the arrays are sorted numerically, and a histogram which identities the pixel value that occurs the most frequently is computed.

This process is repeated until the background frame is constructed with the most occurring pixel in each location.

The pre-processing steps extracts the background image even if there are no empty frames within the first N frames.

The background frame is then stored into a database for future access.

A learning process may also be applied to determine a parameter set $\rho$ which will be used to capture an entering and leaving pattern for each fixed angle camera.

Figure 7:
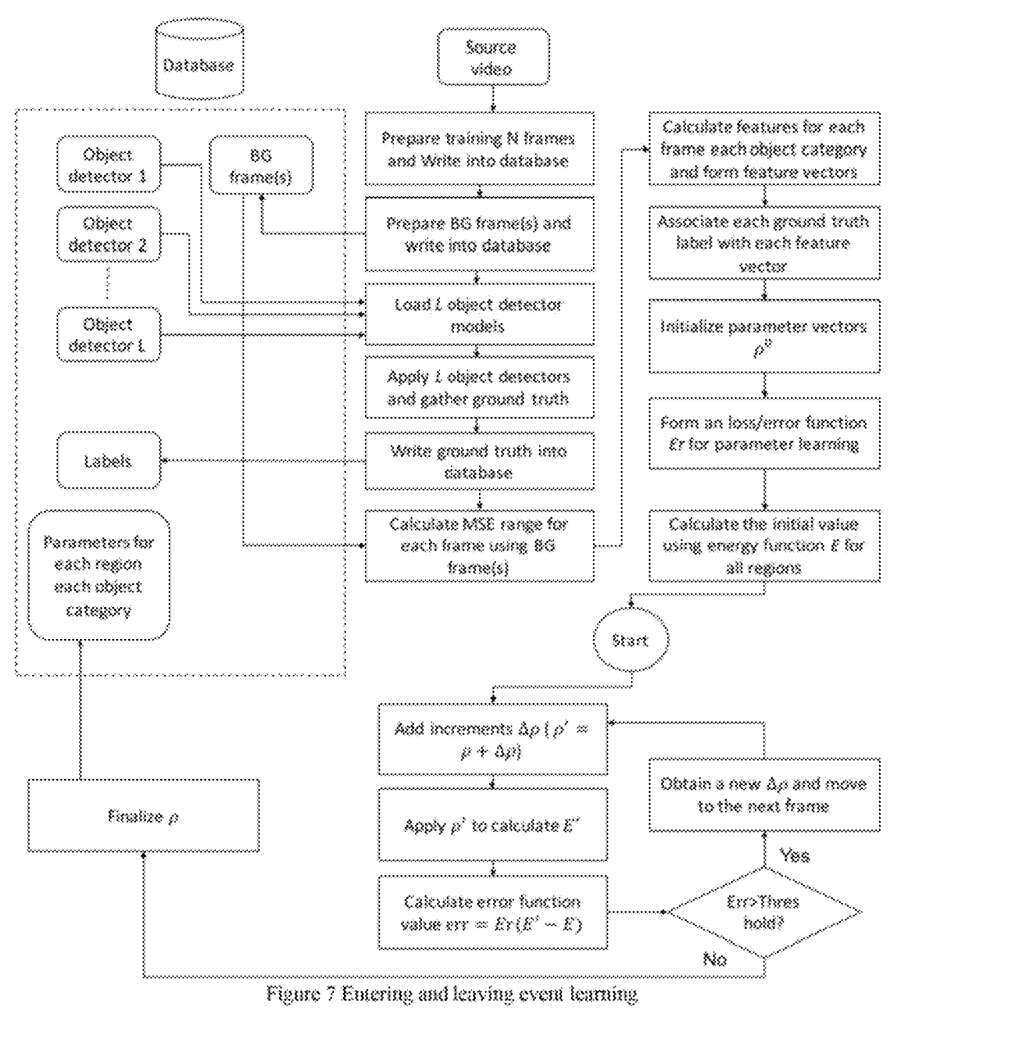
FIG. 7 is a depiction of entering and leaving event learning.

The learned parameter set $\rho$ for each camera is distinguishable from one another due to different viewing angles, focal settings, scene layouts (e.g., highway or residential) and traffic patterns, which need to be determined by a learning process illustrated in FIG. 7 to enable automation afterwards.

The learning process starts from acquiring the ground truth information for each frame and the ground truth is a list of contents in each frame for an initial portion of the video.

The ground truth is generated by applying multiple object detectors to each frame in that initial video portion or possibly labelled manually.

The ground truth is useful in determining the accuracy of our engine and gathering training data for the machine learn algorithm and it is saved into the database.

The next initialization step is to calculate two sets of MSE ranges, one for empty frames and one for non-empty frames and the goal is to find the MSE threshold that will filter out as many of the empty frames while keeping most of the non-empty frames, and it is done using the ground truth data and the background frame that were generated from the previous steps.

Pixel difference with respect to the background frame is calculated and squared for each frame, and the MSE is saved in one of two arrays, depending on whether the frame is empty or non-empty according the ground truth, an appropriate threshold value is selected after evaluating both arrays.

Training data is generated for the machine-learning algorithm in last step, the data are frame subtractions between each frame and the previous frame that represent motion of objects and are stored as feature vectors, and are sorted based on if there is a change on contents between frames.

When frame 1's content is empty, and frame 2's content is a car, there is a content change between these two frames, and the feature vectors resulting from subtracting frame 1 from frame 2 are categorized as feature vectors associated with content change, the feature vector data generated here can be used as training material for several different machine-learning approaches.

The parameterized machine learner approaches may be applied for training. In one embodiment of our invention, decision tree, Bayesian classifier, support vector machine may be used for training, and in another embodiment of our invention, artificial neural networks and deep convolution neural networks may be applied as well, the training starts with initializing a parameter set $\rho^o$ for each region in a training frame, and then forming a loss function Er to measure the difference between the ground truth values against the estimated outputs at each iteration.

The learning may be performed in a recursive manner with many iterations going through the entire training dataset before reaching a convergence state.

The error or loss function may be an entropy loss or Euclidian distance between these two numbers.

At each iteration, a small increment $\Delta\rho$ towards the direction of minimizing the loss is added on top of $\rho$ from last iteration, and the loss is re-calculated, and if the loss increases or decreases, the learning process will compute a new increment $\Delta\rho$ based on, for example, the gradient decent of a likelihood function formed by the loss function, it is expected that the loss keeps decreasing until below a certain small threshold in an iterative manner, the parameter $\rho$ can then be finalized as the training converges and stops, and stored in a database for inference engine to use.

The decision engine is accomplished in a two-step approach, first it applies a metric to compare the similarity of the input frame with the background frame, and second it uses a regional-based inferencing method to analyze the output of a frame difference between the current frame and previous frame(s).

Figure 8:
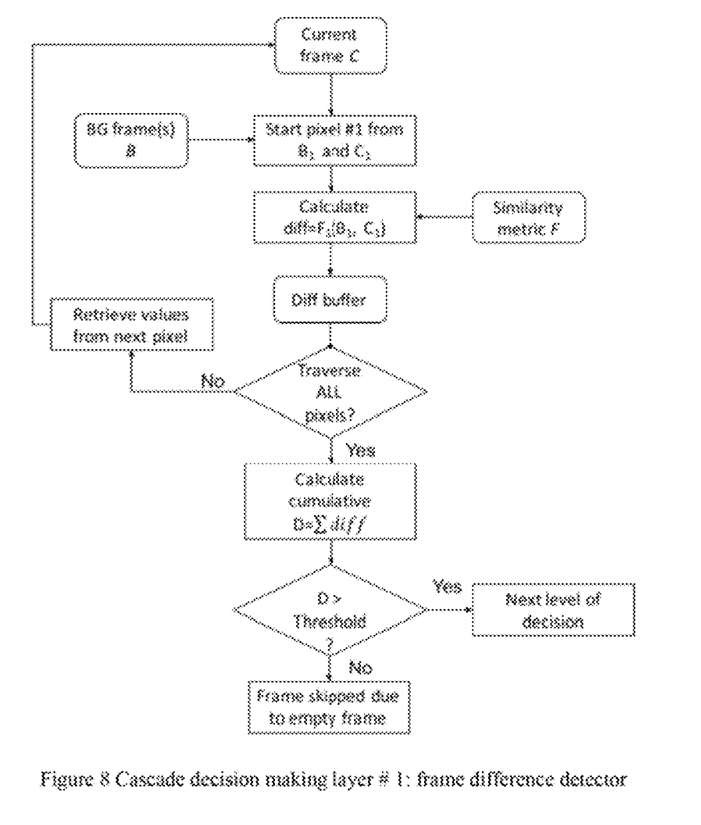
FIG. 8 is a depiction of cascade decision making layer #1: frame difference detector.

The first step is illustrated in FIG. 8, frame differencing between the background frame B and current frame C is calculated by applying a similarity metric equation F and the metric may be a pixel-to-pixel absolute difference or other distance metrics.

The frame differencing process is repeated for every pixel in the image and the stored values are summed and the sum is compared to the difference threshold value, if it is lower, then the frame is considered empty and skipped, and the frame is passed to the next function if it is not lower.

The next function eliminates non-empty frames in which the object in the frame is not moving, this situation is detected by analyzing the frame subtraction between the current frame and the previous frame(s) and this function is similar to the detection of empty frames, the absolute difference between each pixel of the current frame and the corresponding pixel from the previous may be calculated by a similarity metric F.

The differences are stored and summed and if the sum is lower than a threshold, the frame is motionless, and the frame is skipped and the contents of the previous frame is set as the contents of the current frame when the frame is motionless, and if there is motion(s) in the frame, then it is passed to the second decision making engine.

First layer of inference process lends to provide a coarse classification by skipping empty frames and those non-empty frames with motionless objects inside.

Figure 9:
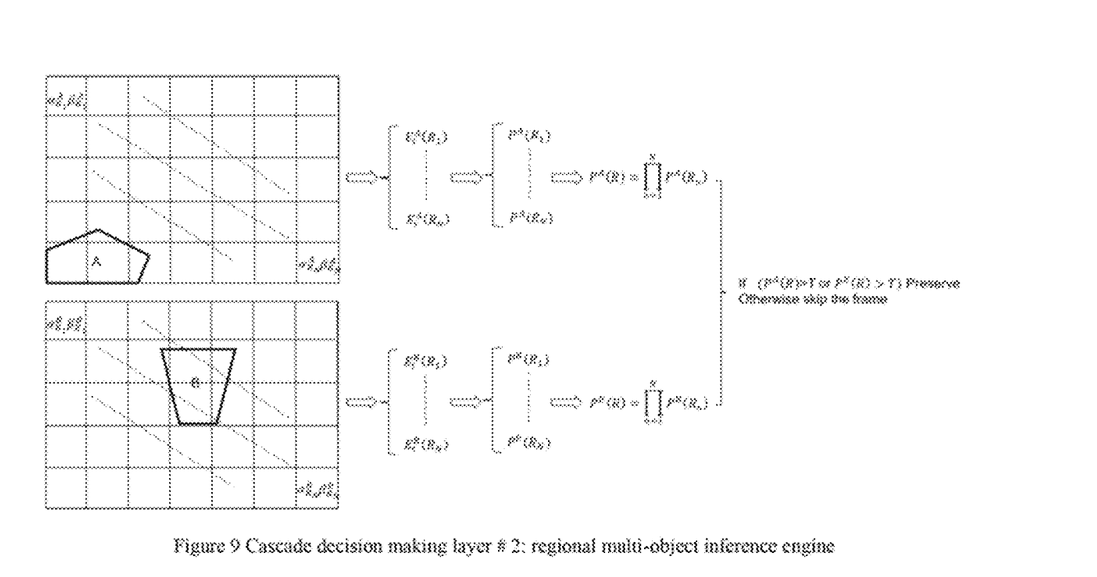
FIG. 9 is a depiction of cascade decision making layer #2: regional multi-object inference engine.

Referring to FIG. 9, a fines inference workflow is appended by exploiting a region-based multi-object entering and leaving event and the workflow shows how to determine whether one or more objects of interests undergo an entering and/or leaving, The purpose of the inference engine is to form a set of features extracted from the current frame, the background frame and a number of previous frames from each connected region in a frame.

The features from each region may capture the entering and leaving pattern of single or multiple objects simultaneously in a sense that the geometrically distributed feature representation encodes the entering and leaving patterns in both spatial and temporal dimensions, where a binary classifier can be applied on these feature representations to determine whether it is an entering and/or leaving event, or a continuously moving event which should be skipped.

In one embodiment of the invention, the features corresponding to object category A (i.e., car for example) may be extracted over each region by applying a mathematical function $\psi^A(x_i; \alpha_{R_n}^A)$ (Equation 1) for current frame, and $\Gamma^A(x_{i,t-T:t}; \beta_{R_n}^A)$ for a sequence of frames. $R_n(n=1, \ldots, N)$ refers to a single region and N the total number of regions in a frame. $x_i(i \in R_n, i=1, \ldots, K_n)$ is the i-th pixel located at region $R_n$, $K_n$ the total number of pixels within the region $R_n$, and K the total number of pixels in one frame. $\alpha_{R_n}^A$ and $\beta_{R_n}^A$ are parameters associated with the feature extraction functions $\psi^A$ and $\Gamma^A$, respectively.

The subscript t refers to the current frame, and T, T>0 a time interval covering a length of a number of previous frames.

In another embodiment of the invention, $\Psi^A(x_i; \alpha_{R_n}^A)$ may be one or more feature extraction functions to spatially filter the pixel intensity over the region $R_n$ along a sequence of previous frames. The functions may include, but not limited to, a Sobel edge tiller, a wavelet transform filter, an intensity histogram, a morphological operator, a shift invariant interest point filter.

In another embodiment of the invention, $\Gamma^A(x_{i,t-T:t}; \beta_{R_n}^A)$ may be one or more features extraction functions to temporally filter the pixel intensity over the region $R_n$.

The functions may include, but not limited to, an optical flow vector, an average temporal filter, an interest point trajectory filter, a temporal median filter. $E_t^A(R_n) = \Sigma_{i \in R_n}^{K_n} \Psi^A(x_i; \alpha_{R_n}^A) + \Sigma_{i \in R_n}^{K_n} \Gamma^A(x_{i,t-T:t}; \beta_{R_n}^A)(n=1, \ldots, N; \Sigma_{n=1}^{N} K_n = K)$ (Eq. 1), and the feature extraction functions corresponding to object category B (i.e., pedestrian for example) are notated by $\Psi^B$ and $\Gamma^B$, and the cumulative outcomes for feature extraction functions are calculated by summing up the values calculated from all pixel locations in each region $R_n$, as represented as $E_t^A(R_n)$ and $E_t^B(R_n)$, respectively. $E_t^B(R_n) = \Sigma_{i \in R_n}^{K_n} \Psi^B(x_i; \alpha_{R_n}^B) + \Sigma_{i \in R_n}^{K_n} \Gamma^B(x_{i,t-T:t}; \beta_{R_n}^B)(n=1, \ldots, N; \Sigma_{n=1}^{N} K_n = K)$ (Eq. 2) and both $\psi^A$ and $\Gamma^A$ are parameterized by $\alpha_{R_n}^A$ and $\beta_{R_n}^A$ for each region, these parameters are learned and determined from the training process for each region, representing the weighted summary of all "effects" produced as the results of $\Psi^A$ and $\Gamma^A$, and as a result, by concatenating $\alpha_{R_n}^A$ and $\beta_{R_n}^A$ overall regions, a parameter vector is formed as $\rho^A = \{\alpha_{R_n}^A, \beta_{R_n}^A | n=1, \ldots, N\}$ and $\rho^B = \{\alpha_{R_n}^B, \beta_{R_n}^B | n=1, \ldots, N\}$ for category A and B, respectively.

The inference engine is 'customized' to weight positively on those regions and patterns presenting higher tendency of entering and leaving by learning these parameters, while suppressing those less likely to happen and each region is equipped with a weight value assigned to it, for each object category, which represents the likelihood of each object entering or leaving that region.

The final decision is first determined by a probability function for each region $R_n$ which may be calculated from Equation 3. $Z(R_n)$ is a normalization factor to make the probability falling into a range between 0 and 1.

Referring to Eq. 3, $$P(R_n) = \frac{1}{Z(R_n)} \exp(-E(R_n)),$$

the resulting values from each region are then accumulated by $P(R) = \Pi_{n=1}^{N} P(R_n)$ and compared to a pre-defined threshold from training phase, if P(R) is larger than the threshold for either one object category, the event is likely happening in which the object is entering or leaving the camera's view; and the frame within this event time window will be preserved for further object classification, and if P(R) is lower than the threshold, the frame(s) will be skipped until the next entering or leaving event is caught in FIG. 9.

Figure 10:
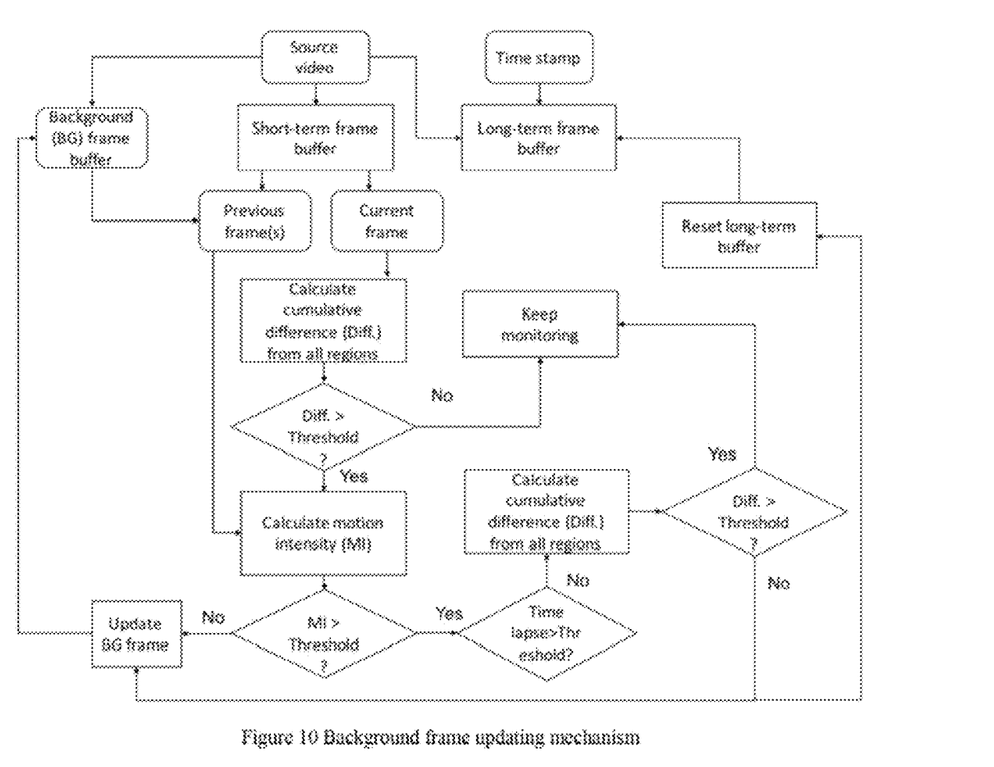
FIG. 10 is a depiction of background frame updating mechanism.

The background frame must be updated periodically in order for the inference engine to continue making the best decisions throughout a long duration video stream.

Different lightning, weather conditions or objects may change and skew MSE calculations throughout the day, and there are two conditions in our engine that trigger a background frame update.

The first condition is if there is a large number of successive frames processed in which an object is in the video, but no motion is detected, and this condition is detected by using a frame subtraction between the current frame and the background frame.

If the calculated cumulative difference between the two frames is greater than a threshold, the motion intensity is calculated based on previous frames stored in the short-term buffer, and if there is insignificant cumulative motion intensity, the background frame is updated.

The second condition captures cases of gradual change in the background frame, such as day and night cycle and weather changes and a long-term buffer to store a few empty frames in the video's history and compare those to current frames by using the same motion intensity calculation.

If the calculated cumulative difference is low or if a set duration has elapsed since the last update, then the background frame is updated.

When the background frame is updated, the time stamp is updated, and the long-term buffer is reset, and the process is illustrated in FIG. 10

What is claimed is:

1. A key frame detector, comprising:
an input interface accepting a video stream having a plurality of frames, wherein the plurality of frames has at least a previous frame and a current frame;
a programmable logic chip coupled to the input interface wherein the programmable logic chip is configured to:
receive a background frame;
determine a similarity based on a comparison of the current frame with the background frame;
discard the current frame if the similarity is greater than a predetermined similarity threshold;
determine an absolute difference on a pixel by pixel basis between the current frame and the previous frame;
discard the current frame if the absolute difference is less than a predetermined absolute difference threshold;
determine a wholeness of an at least one object in the current frame;
discard the current frame if the at least one object is not whole;
provisionally select the current frame if the at least one object is whole;
determine whether the current frame with the whole at least one object has been previously provisionally selected;
discard the current frame if the whole at least one object has been previously provisionally selected; and
analyze the whole at least one object via an object detector in the provisionally selected current frame.

2. The key frame detector of claim 1 wherein the programmable logic chip sends the current frame to the object detector if the whole at least one object enters and remains within the current frame.

3. The key frame detector of claim 1 wherein the programmable logic chip sends the current frame to the object detector if the whole at least one object at least one of enters the current frame and exits the current frame.

4. The key frame detector of claim 1 wherein the programmable logic chip sends the current frame to the object detector when at least two whole objects at least one of enters the current frame and exits the current frame.

5. The key frame detector of claim 1 wherein the programmable logic chip implements a learning process.

6. The key frame detector of claim 5 wherein the learning process comprising:
applying a plurality of object detectors to the current frame;
acquiring a ground truth information list of contents in the current frame from the plurality of object detectors;
determining a set of MSE ranges of an empty background frame and a non-empty provisionally selected frame to set an MSE threshold;
generating a training data set based on a frame subtraction of the previous frame and the current frame to represent a motion of objects;
storing a set of feature vectors of the represented motion of objects; and
sorting the set of feature vectors based on a change of contents between the previous frame and the current frame.

7. The key frame detector of claim 6 wherein the programmable logic chip executes an initialization phase which samples a portion of the current frame to obtain key metrics comprising at least one of the background frame, the set of MSE ranges, and the training data.

8. The key frame detector of claim 1 wherein the programmable logic chip executing current frame matching of the previous frame is based on pixel information from an at least one region of the current frame to accumulate a regional weighting for the at least one region.

9. The key frame detector of claim 1 wherein the programmable logic chip stores an initially generated the background frame.

10. The key frame detector of claim 9 wherein the programmable logic chip decodes and converts color formats of the background frame.

11. The key frame detector of claim 1 wherein the programmable logic chip utilizes an at least one of a pixel-to-pixel absolute difference and distance measurement between the previous frame and the current frame.

12. The key frame detector of claim 1 wherein the programmable logic chip updates the background frame if at least one of:
a cumulative motion density difference between two serial provisionally selected frames is greater than a predetermined motion density threshold; and
the cumulative motion density difference is less than a predetermined background difference threshold between the background frame stored in a historical buffer and the current frame.

13. The key frame detector of claim 1 wherein the programmable logic chip further
assigns an at least one color value for an at least one pixel in the plurality of frames;
stores the at least one color value in an array;
generates the background frame based on a most prevalent color value for the at least one color value in the array; and
stores the background frame.

14. The key frame detector of claim 1 wherein the programmable logic chip further regionally filters the at least one object at least one of entering the current, frame and leaving the current frame.

15. A method of determining a key frame, comprising:
receiving from at least one input interface a plurality of frames having at least a previous frame and a current frame;
assigning an at least one color value for an at least one pixel in the plurality of frames;
storing the at least one color value in an array;
generating a background frame based on a most prevalent color value for the at least one color value in the array;
storing the background frame;
determining a similarity based on a comparison of the current frame with the background frame;
discarding the current frame if the similarity is greater than a predetermined similarity threshold;
determining an absolute pixel by pixel difference between the current frame and the previous frame;
discarding the current frame if the absolute pixel by pixel difference is less than a predetermined absolute difference threshold;
regionally filtering an at least one object at least one of entering the current frame and leaving the current frame; and
selecting the current frame if the at least one object at least one of enters the current frame and leaves the current frame.

16. The method of claim 15, further comprising storing the at east one color value for at least one pixel in a RGB color format.

17. The method of claim 15, further comprising detecting motion by subtracting the current frame from the previous frame to generate a feature vector that detects content changes of the at least one object within the current frame.

18. A method of determining a key frame, comprising:
receiving a plurality of frames from one input interface, wherein the plurality of frames has at least a previous frame and a current frame;
receiving a background frame;
determining a similarity based on a comparison of the current frame with the background frame;
discarding the current frame if the similarity is greater than a predetermined similarity threshold;
determining an absolute difference on a pixel by pixel basis between the current frame and the previous frame;
discarding the current frame if the absolute difference is less than a predetermined absolute difference threshold;
determining a wholeness of an at least one object in the current frame;
discarding the current frame if the at least one object is not whole;
provisionally selecting the current frame if the at least one object is whole;
determining whether the current frame with the whole at least one object has been previously provisionally selected;
discarding the current frame if the whole at least one object has been previously provisionally selected; and
analyzing the whole at least one object via an object detector in the provisionally selected current frame.

19. The method of claim 18, further comprising,
assigning an at least one color value for an at least one pixel in the plurality of frames,
storing the at least one color value in an array, generating the background frame based on a most prevalent color value for the at least one color value in the array, and storing the background frame.

20. The method of claim 18, further comprising, regionally filtering the at least one object at least one of entering the current frame and leaving the current frame.

* * * * *